(12) United States Patent
Adams

(10) Patent No.: US 6,197,078 B1
(45) Date of Patent: Mar. 6, 2001

(54) SLEEVE FILTER

(75) Inventor: Glen Adams, 5565 Rama Road, R.R. #6, Orillia (CA), L3V 6H6

(73) Assignee: Glen Adams, Orillia (CA)

( * ) Notice: Subject to any disclaimer, the term of this patent is extended or adjusted under 35 U.S.C. 154(b) by 0 days.

(21) Appl. No.: 09/245,061

(22) Filed: Feb. 5, 1999

(51) Int. Cl.[7] .............................. B01D 46/02; B01D 39/08
(52) U.S. Cl. ....................... 55/378; 55/498; 55/510; 74/18.2
(58) Field of Search .................... 210/352, 451; 55/379, 498, 510, 378; 464/170, 173; 74/18, 18.2, 609

(56) References Cited

U.S. PATENT DOCUMENTS

| 515,769 | * | 3/1894 | Harris | 210/352 |
|---|---|---|---|---|
| 3,598,192 | * | 8/1971 | Becker | 175/210 |
| 3,722,186 | * | 3/1973 | Parker et al. | 55/304 |
| 3,927,576 | * | 12/1975 | Colletti | 55/523 |
| 4,002,079 | * | 1/1977 | Hall | 74/18.2 |
| 4,439,219 | | 3/1984 | Lambrecht | 55/499 |
| 4,568,313 | | 2/1986 | Diffenderfer et al. | 464/172 |
| 4,702,483 | | 10/1987 | Ukai et al. | 277/212 FB |
| 4,988,113 | | 1/1991 | Chaczyk | 277/212 FB |
| 5,407,570 | | 4/1995 | Hobson, Jr. | 210/232 |
| 5,528,975 | * | 6/1996 | Gautier et al. | 91/376 R |
| 5,605,748 | * | 2/1997 | Kennedy et al. | 210/315 |

* cited by examiner

Primary Examiner—David A. Simmons
Assistant Examiner—Frank M. Lawrence
(74) Attorney, Agent, or Firm—Paul S. Sharpe; Marks & Clerk

(57) ABSTRACT

A filter element adapted for use in reciprocating drilling shafts. The element includes a flexible filter material wrapped about a biasing member and opposed rigid ends. The biasing member returns the filter to an elongate form after compression and spaces the filter material from the shaft. The result is substantially less debris contacting the shaft to thus prevent damage thereto and operational impedance.

10 Claims, 5 Drawing Sheets

SLEEVE FILTER

FIELD OF THE INVENTION

The present invention relates to a sleeve filter and more particularly, the present invention relates to a reusable collapsible filter.

BACKGROUND OF THE INVENTION

Generally, arrangements for protecting shafts from exposure to debris or damage have been previously discussed in the art. Representative of such prior proposals is U.S. Pat. No. 4,568,313, issued Feb. 4, 1986, to Diffenderfer et al. The reference details a bellow type cover suited for articulated shafting. The device is a simple dust cover for use in limited environments.

Chaczyk, in U.S. Pat. No. 4,988,113, issued Jan. 29, 1991, provides a sealed protective boot. The boot surrounds a reciprocating shaft for preventing debris from contacting the shaft. Although a useful system, the boot is prone to premature wear, since the boot must absorb the continuous compression and expansion forces. The wear created from this problem is accelerated upon the accretion of debris, fluids etc. on the boot.

In U.S. Pat. No. 5,407,570, issued to Hobson, Jr., Apr. 18, 1995, a flexible filter element is disclosed. The device includes a spring extended between the ends of the arrangement, with one end sealed by a screw. The concept of the invention is to facilitate reuse of the filter as damage occurs in the form of tears, holes etc., in the filter material. As this occurs, the filter is simply shortened by removing the damaged area and screwing the end back onto the arrangement. As is evident, the spring is thus progressively compressed and thus inherently increases the tension of the filter material and thus the proclivity for expedited wear.

Other prior art marginally relevant to the invention includes U.S. Pat. Nos. 4,439,219 and 4,702,483.

In view of the advances made in the prior art, there exists a need for a sleeve or in-line type filter capable of long term heavy duty. The present invention addresses this need.

SUMMARY OF THE INVENTION

One object of the present invention is to provide an improved filter arrangement designed for long term usage and which is reusable upon soiling.

A further object of the present invention is to provide a filter element, comprising:

opposed rigid ends in spaced relation along a longitudinal axis, each end of the ends having an aperture adapted for receiving a shaft in collocation therethrough, apertures of the ends being in registration;

retaining means on each end of the opposed ends;

biasing means extending between and retained by the retaining means in the opposed ends, the biasing means positioned between the opposed ends to provide an unobstructed path between the apertures; and flexible filter means positioned about the biasing means and the opposed ends defining an internal volume, the filter means for reducing debris ingress into the internal volume.

The use of a spring, as an example, for the biasing means is particularly useful when positioned within the filter element with the filter material positioned about the spring. This facilitates simple removal of the material from the structure for washing and subsequent reuse. The present invention is suitable for use in positioning about fluid operated shafts and in particular, drilling shafts. Once in position, the arrangement functions when compressed or expanded, to prevent metal particulates, fluids or other debris from entering into the shaft housing or contacting the shaft. Considering that the spring is retained by the opposed ends, substantially all of the axial force during compression and expansion is realized by the ends, with the filter material remaining untensioned. As a concomitant advantage, the spring maintains the filter material in spaced relation to a shaft about which the filter is placed. This avoids contact between the two elements and imports "body" to the filter material.

Depending upon the intended use of the device, the filter material may be selected from a host of different fabrics including both synthetic and nonsynthetic. In the case of woven materials, cotton, wool, nylon, burlap, etc. may be employed and for non-woven materials, felt, sponge, treated paper inter alia. In summary, any suitable porous material may be employed. As an adjunct feature, moisture, heat and flame retardants may be added to the filter.

According to a further object of the present invention, there is provided a fluid operated reciprocating piston in combination with a filter, comprising:

a piston assembly including a piston shaft and piston housing within which the piston shaft is mounted for reciprocal motion relative to the housing, the piston having an end, the housing having an end wall;

a filter element positioned about the piston shaft, the filter element including opposed rigid ends in spaced relation along a longitudinal axis, each end of the ends having an aperture for receiving the shaft in collocation therethrough, apertures of the ends being in registration;

retaining means on each end of the opposed ends; and biasing means extending between and retained by the retaining means in the opposed ends, the biasing means positioned between the opposed ends to provide an unobstructed path between the apertures, the biasing means for permitting compression and expansion of the filter element during reciprocal movement of the piston shaft; and flexible filter means surrounding the biasing means releasably connected to the opposed ends defining an internal volume, the filter means for reducing debris ingress into the piston housing and onto the piston shaft.

The spring bias is retained and located by the opposed ends and more particularly by recesses within the inside wall of each end. This allows some tolerance for the spring to move in the event that any irregular forces are experienced by the shaft in use and thus prevents premature wear of the recesses. The exterior of the ends also secure the filter material. The securement may be permanent or may provide any number of variations of fasteners for cooperation with mating fasteners on a removable filter sheet wrapped about the ends and spring. As examples, glue, hook and loop, tape, snaps, buttons, chemical bonding, inter alia may be employed.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE PREFERRED EMBODIMENTS

Figure 1:
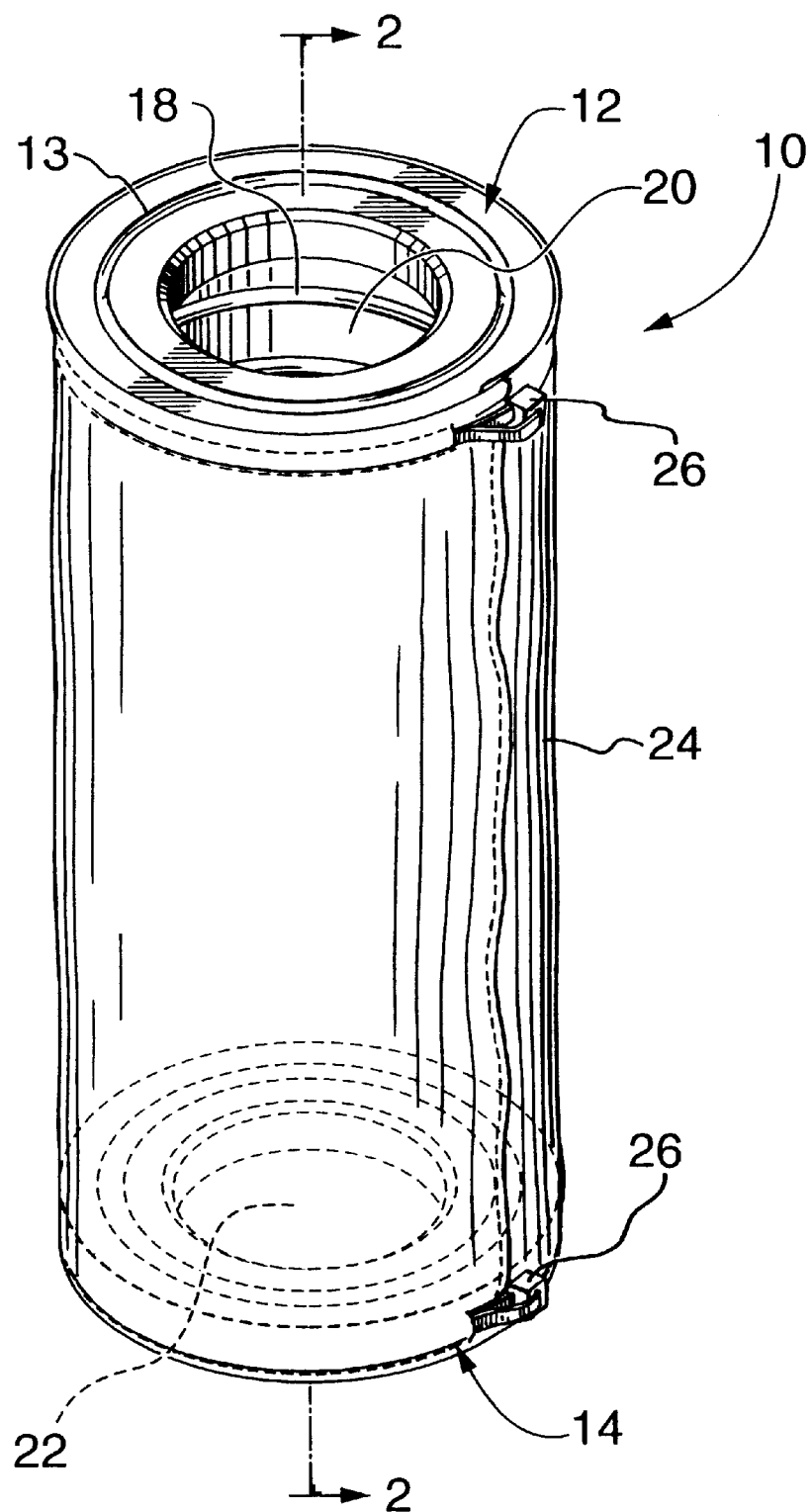
FIG. 1 is a perspective of the filter according to one embodiment of the present invention.

Referring now to the drawings, the filter element according to a first embodiment, is globally referenced by numeral 10. The apparatus 10 includes opposed ends 12 and 14. The ends each comprise a rigid material such as polypropylene, polystyrene, polyethylene etc., and each includes a recess to retain and locate a biasing member, shown in the example as a helical spring 18. A groove or seat 13 may also be included at each end to seat a seal such as an O-ring (not shown). The spring 18 is collocated with apertures 20 and 22 in ends 12 and 14, respectively and has a greater diameter than the apertures 20 and 22. In this manner, the spring 18 does not interfere with either of apertures 20 or 22 and further this structural configuration allows the rigid ends 12 and 14 to receive a substantial amount of the force attributed to compression, torsioning and expansion. This feature significantly reduces premature wear.

In the embodiment shown in FIG. 1, a flexible cloth material 24 is wrapped about the spring 18 and fixedly secured to ends 12 and 14. Securement is achieved by cable ties 26 which may be stitched, glued or integral with the ends 12 and 14.

Figure 2:
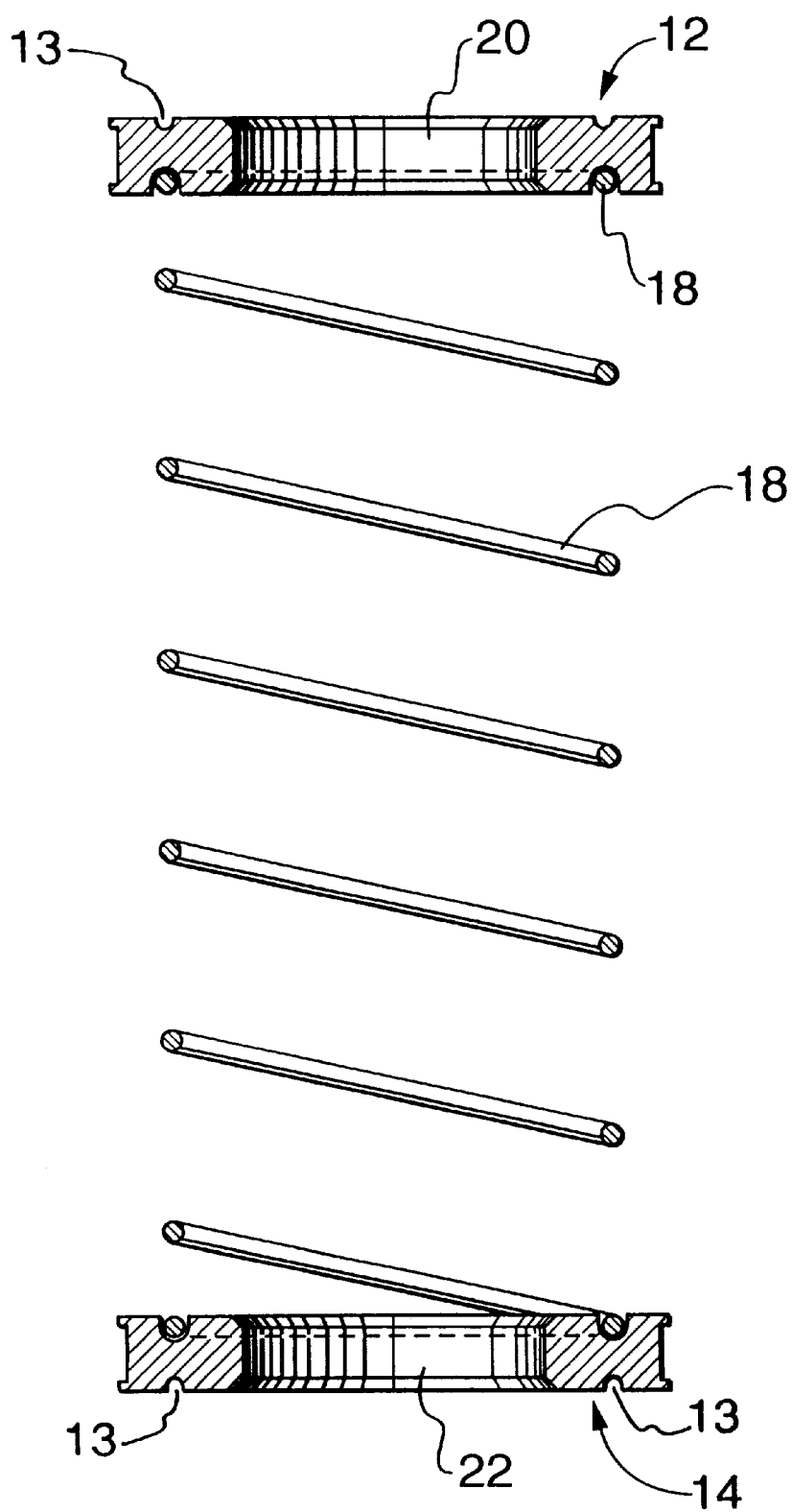
FIG. 2 is a view along section 2—2 of FIG. 1.
Figure 4:
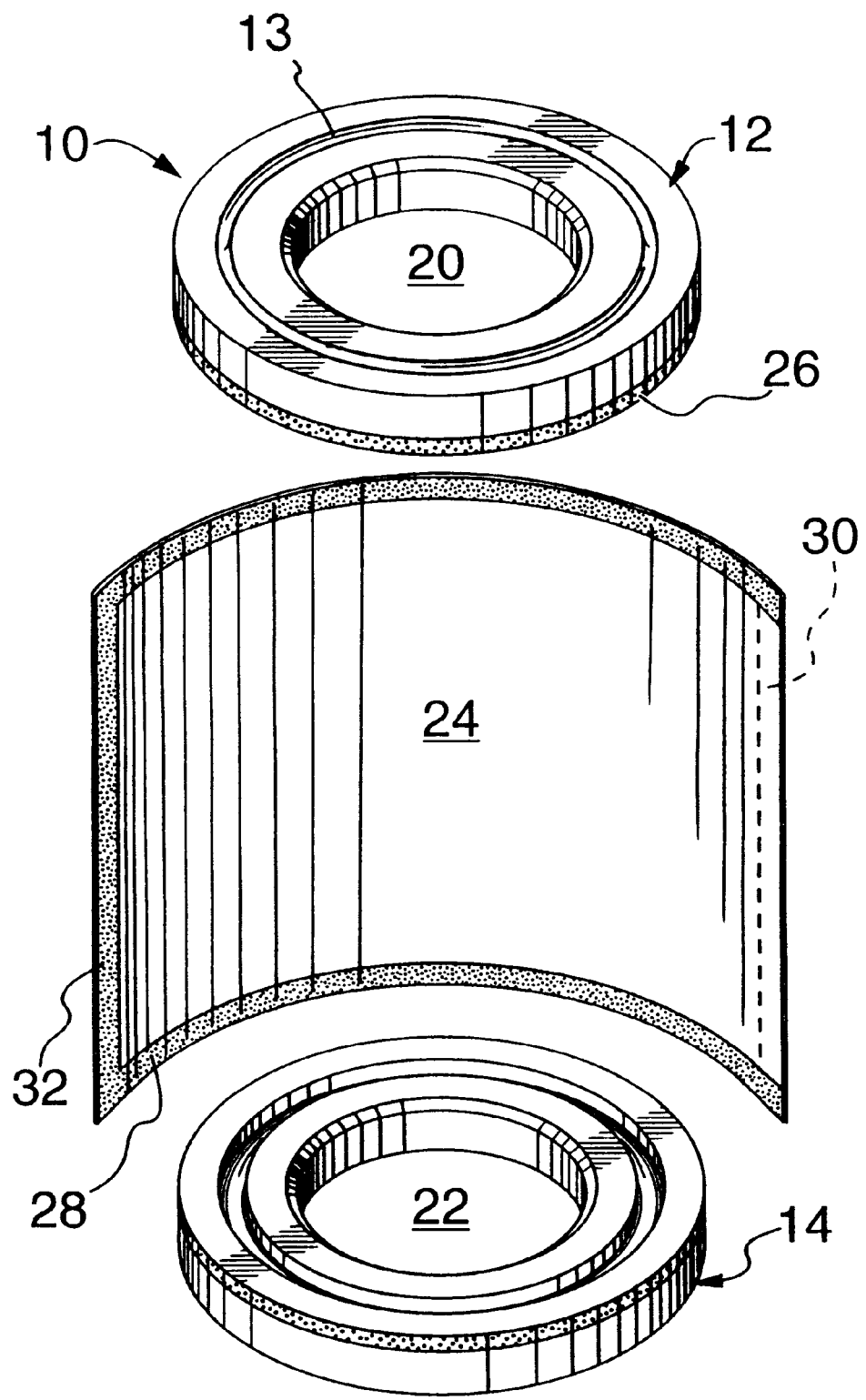
FIG. 4 is an exploded view of an alternate embodiment of the present invention.
Figure 5:
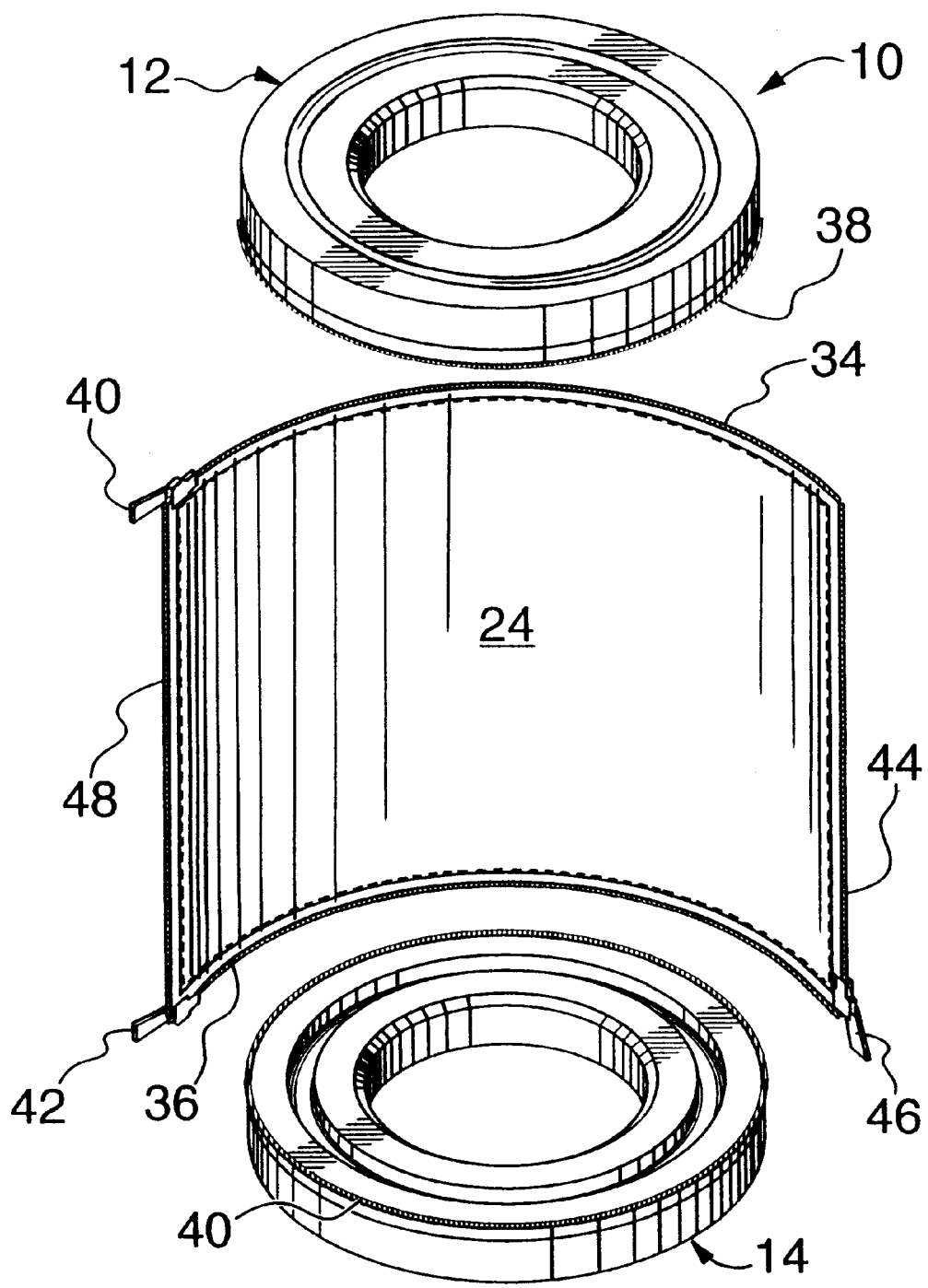
FIG. 5 is an exploded view of a further embodiment of the present invention.

FIGS. 4 and 5 illustrate further embodiments of the filter element incorporating features for repeated reuse of the element. Spring 18 has been removed for purposes of clarity. FIG. 4 illustrates an embodiment where hook and loop material are employed. The ends 12 and 14 each include hook material 27 and the filter cloth 24 provides the loop material 28. The filter cloth may take the form of a sheet for wrapping around ends 12 and 14 and spring 18 (FIG. 2). Connection of the sheet to itself to thus form a cylinder may be achieved by a vertically oriented line of hook material 30 for connection with a similar line of loop material 32.

With reference to FIG. 5, the hook and loop material is replaced with conventional zippers. In the example, the filter sheet 24 includes two horizontally disposed zippers 34 and 36 for connection with teeth 38 and 40 of ends 12 and 14, respectively. Zipper tabs 41 and 42 are provided for quick removal. Similar to the embodiment illustrated in FIG. 4, a vertically disposed zipper 44 with tab 46 engages teeth 48 of the filter 24.

The filter material may be composed of any suitable substance as set forth herein previously. The pore size may vary depending upon the specific environment and nature of debris to which the material will be exposed. The porous structure permits quick expansion and contraction of the element. This differs from bellow arrangements in the prior art which are conventionally non-porous and contain only a single discharge/intake opening.

Figure 3:
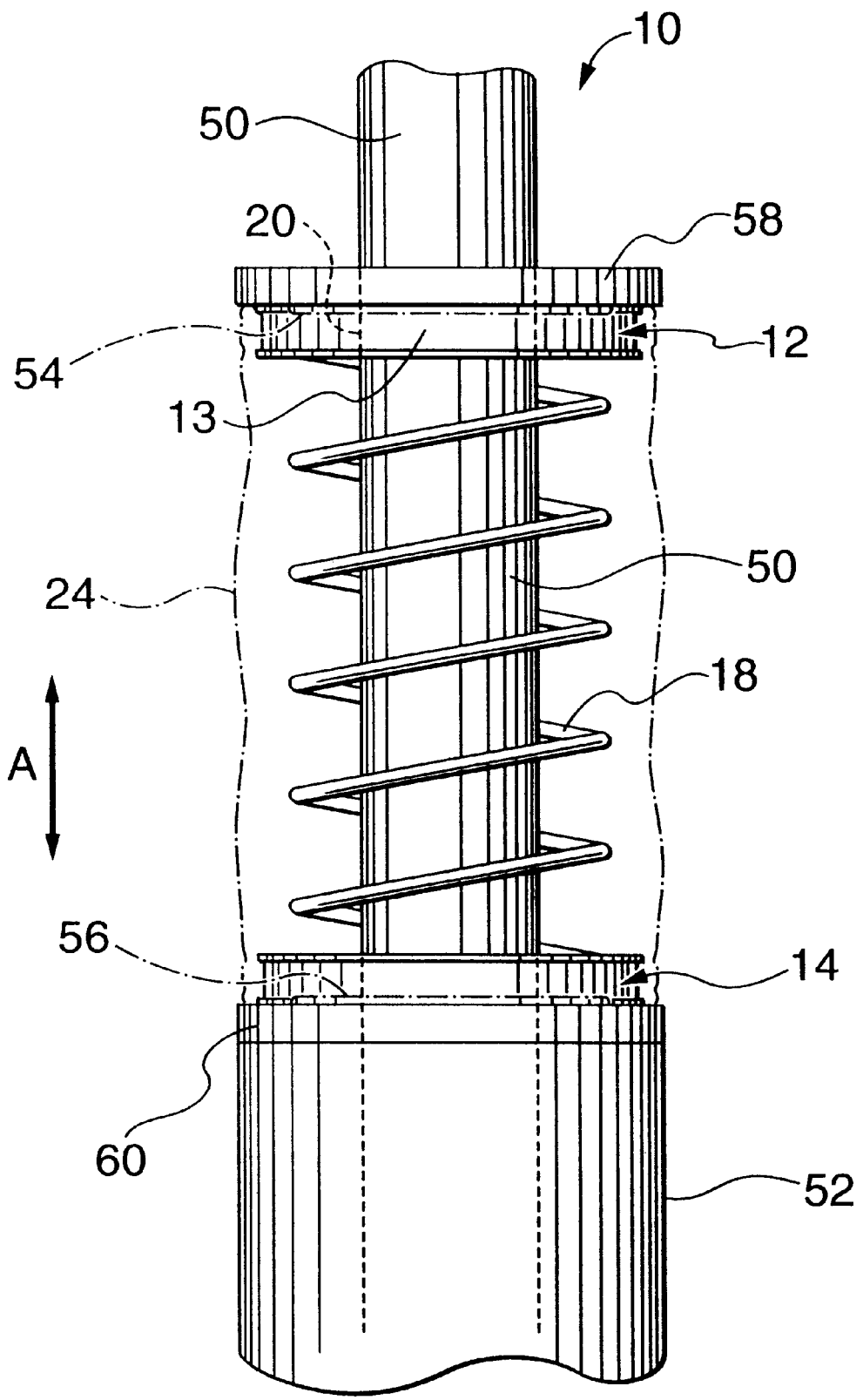
FIG. 3 is a side view of the filter as positioned about a drill shaft.

FIG. 3 illustrates the filter element in use positioned about a typical drilling shaft or piston rod 50 reciprocally movable within housing 52 in the direction indicated by arrow A. The filter element effectively covers the rod 50 and thus prevents debris from contacting the rod 50 and eventually entering the housing 52. Accretion of debris at either of these locations can cause fouling of the mechanical apparatus and inherently lead to expensive down time for repairs, cleaning etc. Additional seals 54 and 56 such as O-rings in seats 13 may be provided in to ensure sealing between the ends 12 and 14 of the filter element and the adjacent sections 58 and 60 of the drill press.

As additional features, the spring 18 may be coated or otherwise treated to be unaffected by the environment of use of the element. Other arrangements for the fastening are contemplated including snap buttons in place of the zippers or hook and loop material.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A filter element, comprising:

opposed rigid ends in spaced relation along a longitudinal axis, each end of said ends having an aperture for receiving a shaft in collocation therethrough, apertures of said ends being in registration;

retaining means on each end of said opposed ends;

biasing means extending between and retained by said retaining means in said opposed ends, said biasing means positioned between said opposed ends to provide an unobstructed path between said apertures; and flexible filter means positioned about said biasing means and said opposed ends defining an internal volume, said filter means for reducing debris ingress into said internal volume, said flexible filter means being independent of said biasing means, said filter element being collapsible and expandable with respect to said longitudinal axis, said retaining means having a recess within each of said rigid opposed ends for receiving and locating said biasing means.

2. The filter element as set forth in claim 1, wherein said biasing means comprises a helical spring having opposed ends, each end retained by said retaining means.

3. The filter element as set forth in claim 1, wherein said flexible filter means comprises cloth material.

4. The filter element as set forth in claim 3, wherein said flexible filter means is releasably mounted to said opposed ends and comprises cloth material.

5. The filter element as set forth in claim 2, wherein said helical spring is surrounded by said flexible filter means and independent of said filter means.

6. The filter element as set forth in claim 4, wherein said cloth material comprises a sheet of woven material.

7. The filter element as set forth in claim 4, wherein said cloth material comprises a sheet of non-woven material.

8. The filter element as set forth in claim 4, wherein said opposed ends each include first cooperating engagement means, said flexible filter means including second cooperating engagement means for releasable engagement with said first cooperating engagement means.

9. The filter element as set forth in claim 8, wherein said first cooperating engagement means and said second cooperating engagement means each comprise one of hook and loop material to facilitate connection.

10. The filter element as set forth in claim 8, wherein said first cooperating engagement means and said second cooperating engagement means each comprise mating portions of a zipper.

\* \* \* \* \*